United States Patent
Zhang

(10) Patent No.: US 9,204,449 B2
(45) Date of Patent: Dec. 1, 2015

(54) METHOD OF ASSIGNING AN IDLE STATE ACCESS TERMINAL TO A CARRIER IN A MULTIPLE CARRIER WIRELESS COMMUNICATION SYSTEM BASED ON LOAD ON CONTROL CHANNEL RESOURCES

(75) Inventor: Bulin Zhang, Branchburg, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 2414 days.

(21) Appl. No.: 12/010,150

(22) Filed: Jan. 22, 2008

(65) Prior Publication Data

US 2009/0186627 A1 Jul. 23, 2009

(51) Int. Cl.
*H04W 72/00* (2009.01)
*H04W 72/04* (2009.01)
*H04W 28/08* (2009.01)

(52) U.S. Cl.
CPC .......... *H04W 72/0486* (2013.01); *H04W 28/08* (2013.01); *H04W 72/048* (2013.01)

(58) Field of Classification Search
USPC .......... 455/453, 458, 450, 454; 370/437, 431, 370/459, 458, 329
See application file for complete search history.

(56) References Cited

U.S. PATENT DOCUMENTS

| | | | |
|---|---|---|---|
| 5,754,959 A * | 5/1998 | Ueno et al. | 455/453 |
| 6,138,025 A * | 10/2000 | Lee et al. | 455/453 |
| 6,611,506 B1 | 8/2003 | Huang et al. | |
| 2004/0125768 A1 | 7/2004 | Yoon et al. | |
| 2005/0064886 A1 * | 3/2005 | Kim et al. | 455/466 |
| 2006/0146869 A1 * | 7/2006 | Zhang et al. | 370/465 |
| 2007/0218913 A1 * | 9/2007 | Chen | 455/450 |
| 2009/0080353 A1 * | 3/2009 | Zhang et al. | 370/312 |
| 2010/0278134 A1 * | 11/2010 | Ankel et al. | 370/329 |

FOREIGN PATENT DOCUMENTS

| | | |
|---|---|---|
| CN | 1717951 | 1/2006 |
| CN | 101031103 | 9/2007 |
| EP | 1 677 563 | 7/2006 |
| JP | 2000-224650 | 8/2000 |
| JP | 2006-512816 | 4/2006 |
| WO | WO 99/04511 | 1/1999 |
| WO | WO 2004/060011 | 7/2004 |
| WO | WO 2006/047572 | 5/2006 |
| WO | WO 2004/115440 | 11/2006 |

OTHER PUBLICATIONS

International Preliminary Search Report dated Apr. 23, 2010.
R. Attar et al., "Evolution of cdma2000 cellular networks: multicarrier EV-DO," IEEE Communication Magazine, IEEE Service Center, Piscataway, vol. 44, No. 3, Mar. 1, 2006, pp. 46-53.

(Continued)

*Primary Examiner* — Justin Lee
(74) *Attorney, Agent, or Firm* — Harness, Dickey & Pierce, P.L.C.

(57) ABSTRACT

In one embodiment, the method includes determining loads on control channel resources of at least two of the multiple carriers, and assigning the access terminal to one of the multiple carriers based on the determined loads.

18 Claims, 2 Drawing Sheets

(56) References Cited

OTHER PUBLICATIONS

Wang Xiaoyi et al., "Enhanced Proportional Fair Scheduling for cdma2000 1x DV-DO Reverse Link,"Wireless and Optical Communications Networks, 2006 IFIP International Conference on Bangalore, India, Piscataway, NJ, USA, IEEE, Apr. 11, 2006, pp. 1-5.
Mingxi Fan et al., "On the reverse link performance of cdma2000 1xEV-DO revision a system," Communciations, 2005 IEE Conference on Seoul , Korea, IEEE vol. 4, May 16, 2005, pp. 2244-2250.
International Search Report and Written Opinion dated Jun. 3, 2009.
Office Action for corresponding Japanese Application No. 2010-544306 dated Jul. 25, 2012 and English translation thereof.
Office Action for corresponding Chinese Application No. 20090102816.2 dated Nov. 20, 2012 and English translation thereof.

* cited by examiner

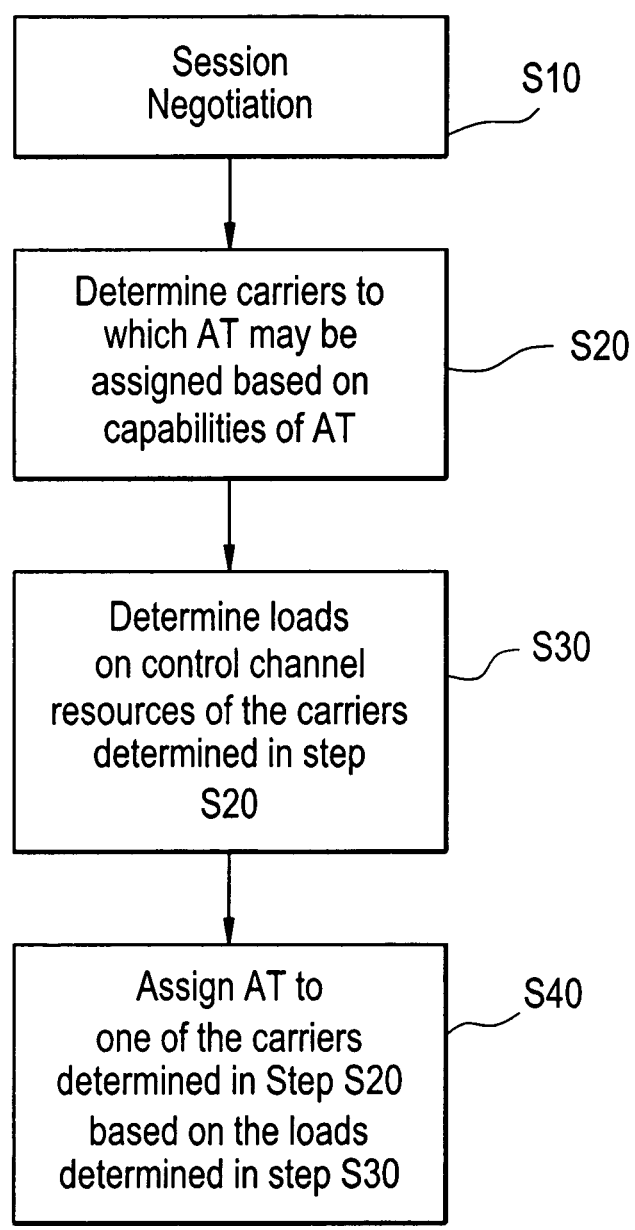

METHOD OF ASSIGNING AN IDLE STATE ACCESS TERMINAL TO A CARRIER IN A MULTIPLE CARRIER WIRELESS COMMUNICATION SYSTEM BASED ON LOAD ON CONTROL CHANNEL RESOURCES

BACKGROUND OF THE INVENTION

Wireless communication standards such a CDMA First Evolution-Data Only (1xEV-DO) provide for multiple carriers to increase capacity of the system as well as provide different levels and types of services. For systems with multiple carriers, balancing the load on the carriers so the system resources may be fully utilized is desirable. The system resources may be considered as having two parts, traffic channel resources and control channel resources. For example, the access channel and paging channel of each carrier are part of the control channel resources.

Depending on the system organization, the carriers are divided into two or more classes. For example, there are several wireless communication systems capable of providing broadcast/multicast services (BCMCS), and carriers that carry BCMCS may be one class while carriers that do not carry BCMCS may be a different class.

FIG. 1 illustrates a conventional wireless system, for example, an EV-DO system 100 supporting multiple carriers. An Access Terminal (AT) (also known as a mobile terminal or a mobile station) 10 may be connected with a plurality of Access Nodes (ANs) 20. The ANs 20 are connected to a Radio Network Controller (RNC) 30. The RNC 30 provides services and coordination between the ATs 10 and external systems, for example, a Packet Data Service Node (PDSN) 50. The system 100 may include a number of RNCs 30, and each RNC 30 may have a plurality of ANs 20 associated therewith. The PDSN 50 is a termination node and may be connected to an Internet 40 or other systems capable of providing data services to the AT 10. The PDSN 50 may also be connected to a Broadcast/Multicast Service (BCMCS) content server 60. The BCMCS content server 60 may provide broadcast data, which may include multi-media data, such as text, audio, picture, streaming video, Internet protocol packets, etc. to the AT 10. The content is typically generated and provided to the ATs that subscribe to a particular service over a broadcast channel of the wireless communication system.

As is well-known, when an AT 10 enters the coverage area of an RNC 30, the AT 10 negotiates a session setup. In this context, the AT 10 is in the idle state, and the session simply refers to the duration the AT 10 is in the coverage area of the RNC 30. According to the EV-DO Rev A standard, a traffic channel is established between the AT 10 and the RNC 30, and the session setup is negotiated through the traffic channel. During the session setup, parameters are shared between AT 10 and RNC 30. The AT 10 notifies the RNC 30 of its capabilities, etc. For example, the AT 10 may notify the RNC 30 whether it is BCMCS enabled or not, the AT 10 may notify the RNC 30 of its electronic serial number (ESN), etc. The RNC 30 notifies the AT 10 of the multiple carriers supported by the ANs 20 associated with the RNC 30 and the class of each carrier. Based on the information from the AT 10, the RNC 30 also assigns a class to the AT 10. For example, if the carriers are divided into a BCMCS class and a non-BCMCS class, then if the AT is BCMCS enabled, the AT is assigned the BCMCS class.

Based on the assigned class, the AT 10 hashes onto one of the carriers having the same class as the serving carrier. Typically, each AT 10 hashes to a carrier using a hashing algorithm based on a unique identifier of the AT 10 such as an electronic serial number (ESN). The RNC 30 performs the same hashing algorithm to determine the selection made by the AT 10. The AT 10 will then monitor the control/paging channels of the serving carrier. This is often referred to as camping onto the carrier. The AT 10 will also access the wireless communication system over the access channel of the serving carrier.

SUMMARY OF THE INVENTION

With reference to the above discussion, because the function of selecting a serving carrier resides with the access terminal (AT), this makes load balancing the control channel resources of the carriers by the wireless communication system prohibitive.

The present invention relates to a method of assigning an idle state access terminal to a carrier in a multiple carrier wireless communication system to balance the load on the control channel resources.

In one embodiment, the method includes determining loads on control channel resources of at least two of the multiple carriers, and assigning the access terminal to one of the multiple carriers based on the determined loads.

Another embodiment includes assigning a unique class to each of the multiple carriers, selecting one of the multiple carriers based on a load on control channel resources of at least one of the carriers, and assigning the access terminal to the selected carrier by assigning the access terminal the class of the selected carrier.

BRIEF DESCRIPTION OF THE DRAWINGS

Example embodiments of the present invention will become more fully understood from the detailed description given herein below and the accompanying drawings, which are given by way of illustration only and thus are not limiting of the example embodiments of the present invention.

FIG. 2 illustrates a flow chart of the method of assigning access terminals to carriers of a multi-carrier wireless communication system to balance the load on control channel resources of the carriers according to an example embodiment of the present invention.

DETAILED DESCRIPTION OF THE EXAMPLE EMBODIMENTS

Figure 1:
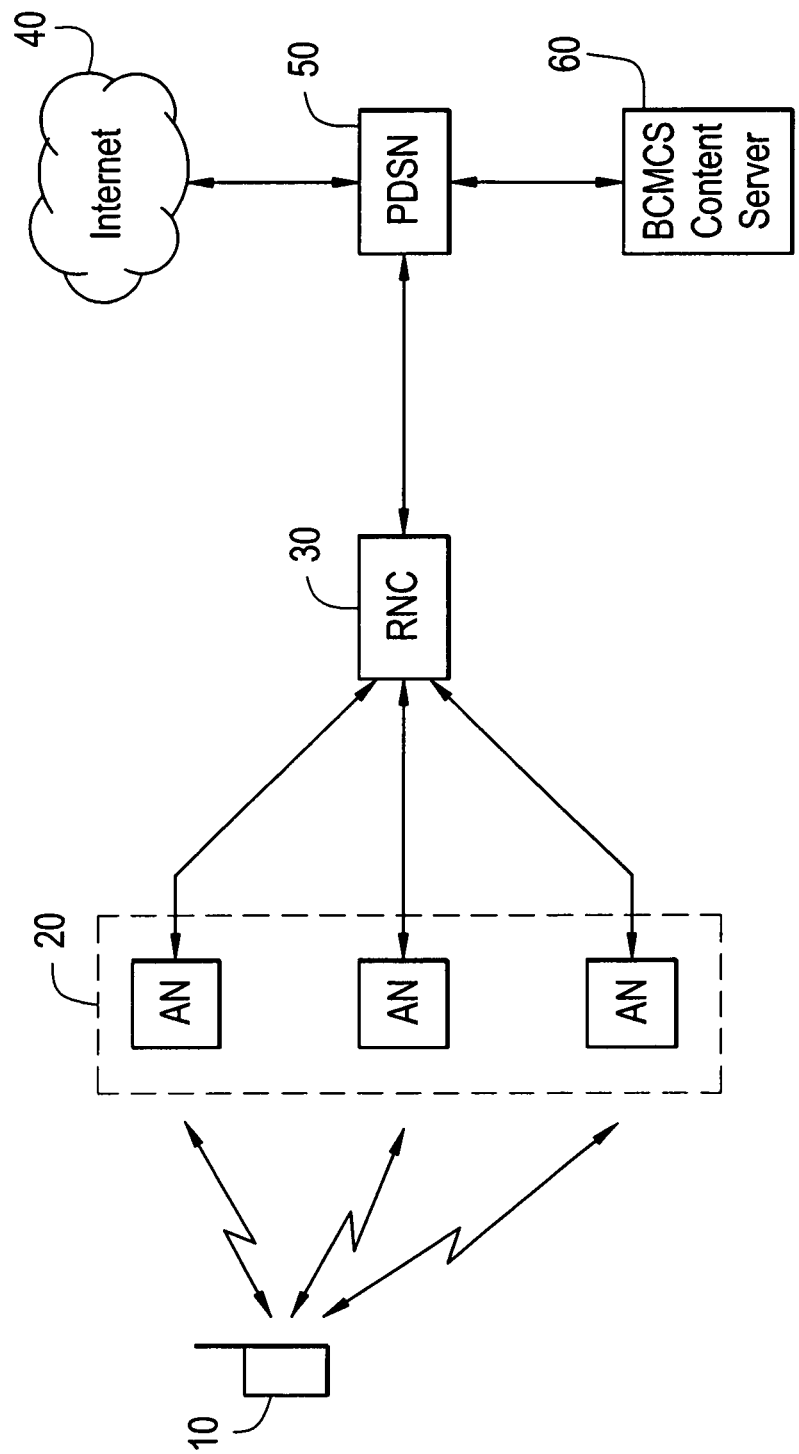
FIG. 1 is a conventional wireless communication system, which may be used in example embodiments of the present invention.

Although example embodiments of the present invention will be described with reference to an EV-DO system and using EV-DO terminologies, a person of ordinary skill will recognize the present invention may be applied to other telecommunication systems.

It will be understood that, although the terms first, second, third etc. may be used herein to describe various elements, components, regions and/or sections, these elements, components, regions and/or sections should not be limited by these terms. These terms may be only used to distinguish one element, component, region, or section from another region or section. Thus, a first element, component, region or section discussed below could be termed a second element, component, region or section without departing from the teachings of the present invention.

The terminology used herein is for the purpose of describing particular example embodiments only and is not intended to be limiting. As used herein, the singular forms "a", "an"

and "the" may be intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-section illustrations that may be schematic illustrations of idealized embodiments (and intermediate structures). Thus, the example embodiments should not be construed as limited to the particular location and arrangements illustrated herein but are to include deviations thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "mobile" may be considered synonymous to, and may hereafter be occasionally referred to, as a mobile unit, mobile station, mobile user, access terminal (AT), user equipment (UE), subscriber, user, remote station, access terminal, receiver, etc., and may describe a remote user of wireless resources in a wireless communication network. The term "base station" may be considered synonymous to and/or referred to as a base transceiver station (BTS), base station, NodeB, access node (AN), etc. and may describe equipment that provides data and/or voice connectivity between a network and one or more users.

As is well-known in the art, each of a mobile and a base station may have transmission and reception capabilities. Transmission from the base station to the mobile is referred to as downlink or forward link communication. Transmission from the mobile to the base station is referred to as uplink or reverse link communication.

Loads on Control Channel Resources

Referring to the discussion of FIG. 1 above, during the idle state, the AT 10 camps onto the serving carrier to periodically monitor information sent by the EV-DO system 100. When the EV-DO system 100 receives a communication request (e.g., data communication) for the AT 10, the EV-DO system 100 will send a page on a paging channel over the serving carrier. The page is sent through the ANs 20 in the system 100 to locate the AT 10. The AT 10 may acknowledge the page by sending an acknowledgement over an access channel of the serving carrier. A traffic channel may then be established between the AT 10 and the RNC 30 handling the communication request. Also, when the AT 10 originates communication, the AT 10 will send an access message over the access channel to the EV-DO system 100 via the serving carrier. A traffic channel may then be established between the AT 10 and the RNC 30 handling the communication request.

Accordingly, communication between the AT 10 and the EV-DO system 100 is enabled by two (2) control channels, the paging channel and the access channel. The paging channel is used to verify the location of the AT 10 within the EV-DO system 100 and to assist in delivering incoming calls to the AT 10. The access channel is also used by the AT 10 to register for such tasks as reporting power-up, reporting changes in its location, etc. as well as requesting call origination.

The ANs 20, however, do not usually have accurate information regarding the precise geographical location of each of the ATs 10 within a service area, because the AT 10 is capable of roaming between page messages and/or the AT 10 may turn-off and significantly move from its last identified location before the AT 10 is turned on again and located by a page message. Consequently, when a call is initiated to an AT 10 believed to be within a particular service area, a page is broadcast over a paging channel to all cells (e.g., all ANs 20) in the service area. When the AT 10 responds to the page message, the particular cell serving the AT 10 is then identified, and the call is initiated. In the event there is no response to the page, the ANs 20 assume that the AT 10 is currently inactive and the call is treated accordingly.

Since each typical RNC 30 in an urban area may serve a system with over hundreds of cells, in order to broadcast a page message over the paging channel for all the cells in such a typical system, the paging message must be replicated a corresponding number of times and sent to each cell. Any one cell in the system can receive a response from the AT 10. System wide, each cell sends paging messages for every call initiated to every AT 10 operating within, or believed to be operating within, the service area. The sent paging messages are known as a paging channel load. There are several well-known methods of detecting and determining the paging channel load. Accordingly, not all of these methods will be discussed in detail for the sake of brevity.

Pages are only sent on a paging channel of the serving carrier to which an AT 10 is assigned. As described above, conventionally, a hashing algorithm may be performed by both the AT 10 and EV-DO system 100 to determine the serving carrier for the AT 10. The hashing also allows the EV-DO system 100 to determine the number of ATs 10 camping on each carrier. Assuming, on average, the number of ATs 10 camping on each carrier is roughly the same and the paging messages (usage) for each AT 10 is roughly the same, then the paging load is balanced for the multiple carriers.

If an AT 10 wishes to make a call or request a service, the AT 10 connects (registers) to the EV-DO system 100 via the access channel. In addition, the access channel may be used by the AT 10 to respond to the paging message. Similar to the paging channel load, if several ATs 10 register or respond to a paging message, such a load is known as an access channel load. Assuming on average, the number of ATs 10 camping on each carrier is roughly the same and their uses of the access channel are the roughly the same, then the access channel load is balanced for the multiple carriers.

However, the above assumptions regarding paging channel load and access channel load do not generally hold true, and the loads between the carriers of a multiple carrier wireless communication system are unbalanced.

Example Embodiment of Method of Balancing Load on Control Channel Resources

Embodiments of the present invention will be described with reference to the conventional wireless system described above with respect to FIG. 1. However, it will be appreciated that these embodiments are not limited to the system of FIG. 1.

In the embodiments of the present invention, the multiple carriers are divided into different categories. The multiple carriers may be divided into different categories in the same manner that the multiple carriers were conventionally divided into different classes. Accordingly, more than one carrier may be in the same category. For example, more than one carrier may be categorized as a BCMCS carrier, or more than one carrier may be categorized as a non-BCMCS carrier. Furthermore, each carrier of the multiple carriers is assigned a unique class. Therefore, each class will be associated with only a single carrier.

FIG. 2 illustrates a flow chart of the method of assigning ATs to carriers of a multi-carrier wireless communication system to balance the load on the carriers according to an example embodiment of the present invention. As shown, in step S10 the RNC 30 conducts a session negotiation with an AT 10 as is well-known and as was discussed in detail above.

Based on the information from the AT 10, the RNC 30 determines the carriers to which the AT 10 may be assigned in step S20. For example, if the AT 10 is BCMCS enabled, then the AT 10 is restricted to the carriers in the BCMCS category. By contrast, if the AT 10 is not BCMCS enabled, the AT 10 may be assigned to the carriers in the BCMCS category or the non-BCMCS category. It will be appreciated that the present invention is not limited to these two categories of carriers. Instead, numerous different category arrangements may be designed.

Next, in step S30, the RNC 30 determines the load on control channel resources of the carriers determined in step S20. The method of determining load on control channel resources of the carriers will be described in detail below. Based on the determined loads, the RNC 30 assigns the AT 10 to the least loaded one of the carriers determined in step S20. More specifically, the RNC 30 assigns the AT 10 the class of the carrier determined to have the least load on its control channel resources. Because each class only has one associated carrier, the hashing algorithm performed by the AT 10 will result in selecting that carrier as the serving carrier.

Examples of Determining Load on Control Channel Resources

With reference to discussion above, in one embodiment, the RNC 30 determines the load on control channel resources of each carrier based on the number of ATs assigned to the carrier. Accordingly, of the carriers determined in step S20, the least loaded carrier will be the one with the fewest number of assigned ATs, and the RNC 30 will assign the AT 20 to this carrier in step S40.

Example embodiments of the present invention are not limited to just balancing the load on control channel resources of the carriers based on the number of ATs 10 assigned the carriers. The load on control channel resources of the carriers may be balanced based on a paging channel load and/or an access channel load. Even if the number of ATs 10 on each carrier is balanced, the paging channel load may not be balanced due to the different types of service each AT 10 is using/receiving (usage imbalance). For example, ATs 10 with voice over IP (VoIP) service may trigger more pages than ATs 10 only surfing the web.

An example of determining load control channel resources where usage imbalance may exist will now be described with respect to a VoIP AT 10, but example embodiments of the present invention are not limited to a VoIP AT 10. An AT 10 with a VoIP service is more likely to receive page messages than a non-VoIP enabled AT 10. Therefore, it may be assumed that the VoIP enabled AT 10 will receive m times more page messages than a non-VoIP AT 10. Lets assume that m=2. To determine the load on control channel resources of a carrier, the following equation (1) may be used:

$$\text{Load on control channel resources of carrier} = m \times N\_X + N\_G \quad (1)$$

where $N\_X$ is the number of VoIP ATs on the carrier, and $N\_G$ is the number of non-VoIP ATs on the carrier.

It will be appreciated by a person of ordinary skill that there are many dynamic and static methods of determining the access channel and/or page channel loads. For example, a paging load may be determined by determining a number of used slots in a paging channel, or determining a number of page messages over a time period. The access channel load may be determined by determining the number of access messages over a time period, and measuring a percentage of time the access channel is used. Other methods of determining the load on control channel resources may also be used in example embodiments of the present invention.

Furthermore, instead of balancing load on control channel resources based only on the paging channel load or only on the access channel load, these two load determinations may be combined and the AT assigned to a carrier based on the combined load determinations. Still further, the loads on other control channels may be used alone or as part of the load combination.

Example embodiments of the present invention being thus described, it will be obvious that the same may be varied in many ways. Such variations are not to be regarded as a departure from the invention, and all such modifications are intended to be included within the scope of the invention.

What is claimed is:

1. A method of assigning an idle state access terminal to a carrier in a multiple carrier wireless communication system, comprising:
   determining, by a network element, loads on control channel resources of at least two of the multiple carriers; and
   assigning, by the network element, the access terminal to one of the multiple carriers based on the determined loads, wherein
   the determining determines the load on the control channel resources of a carrier based on a load on an access channel of the carrier.

2. The method of claim 1, wherein the determining determines the load on the control channel resources of a carrier based on a number of access terminals assigned to the carrier.

3. The method of claim 1, wherein the determining determines the load on control channel resources of a carrier based on a load on a paging channel of the carrier.

4. The method of claim 3, wherein the paging channel load is determined based on a number of paging channel messages.

5. The method of claim 3, wherein the paging channel load is determined based on a number of used slots in the paging channel.

6. The method of claim 1, wherein the access channel load is determined based on a number of access channel messages.

7. The method of claim 1, wherein the access channel load is determined based on a percentage of time the access channel is used.

8. The method of claim 1, wherein the determining determines the load on the control channel resources of a carrier based on the load on the access channel of the carrier and a load on a paging channel of the carrier.

9. The method of claim 1, further comprising:
   receiving information on capabilities of the access terminal;
   determining carriers of the multiple carriers to which the access terminal may be assigned based on the received information; and wherein
   the determining loads determines loads on the control channel resources of the determined carriers; and
   the assigning assigns the access terminal to one of the determined carriers based on the determined loads.

10. The method of claim 9, wherein the assigning assigns the access terminal to a least loaded one of the determined carriers.

11. The method of claim 9, wherein
at least one of the carriers provides one of broadcast and multicast services (BCMCS), and at least one of the carriers does not provide (BCMCS); and
if the received information indicates the access terminal is enable to receive BCMCS, the determining carriers determines only the BCMCS carriers.

12. The method of claim 11, wherein if the received information indicates the access terminal is not enabled to receive BCMCS, the determining carriers determines the BCMCS carriers and the non-BCMCS carriers.

13. The method of claim 12, wherein
each of the multiple carriers is assigned a unique class; and
the assigning assigns the access terminal a same class as a least loaded one of the determined carriers.

14. The method of claim 1, wherein
each of the multiple carriers is assigned a unique class; and
the assigning assigns the access terminal a same class as a least loaded one of the at least two carriers.

15. The method of claim 1, wherein the assigning assigns the access terminal to a least loaded one of the at least two carriers.

16. A method of assigning an idle state access terminal to a carrier in a multiple carrier wireless communication system, comprising:
assigning, by a network element, a unique class to each of the multiple carriers;
selecting, by the network element, one of the multiple carriers based on a load on control channel resources of at least one of the carriers, the load on the control channel resources being determined based on a load on an access channel of the at least one of the carriers; and
assigning, by the network element, the access terminal to the selected carrier by assigning the access terminal the class of the selected carrier.

17. The method of claim 1, wherein the assigning assigns the access terminal to the carrier with the smallest control channel load.

18. The method of claim 16, wherein the selecting selects the carrier with the smallest load on control channel resources.

* * * * *